United States Patent
Yokoya et al.

(10) Patent No.: US 7,223,093 B2
(45) Date of Patent: May 29, 2007

(54) COUPLING STRUCTURE BETWEEN INJECTION DRIVING SCREW SHAFT AND ELECTRIC MOTOR IN INJECTION DEVICE

(75) Inventors: Kinji Yokoya, Nagano-ken (JP); Hiroshi Yamaura, Nagano-ken (JP); Hiroo Okubo, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 108 days.

(21) Appl. No.: 10/731,409

(22) Filed: Dec. 9, 2003

(65) Prior Publication Data
US 2005/0123347 A1   Jun. 9, 2005

(51) Int. Cl.
*B32B 1/00* (2006.01)

(52) U.S. Cl. ..................................... 425/587
(58) Field of Classification Search ............... 403/174, 403/177, 191, 234, 235, 351, 352, 396; 464/182; 74/89.23, 424.71; 425/550, 586, 145, 150, 425/449, 151, 587
See application file for complete search history.

(56) References Cited

U.S. PATENT DOCUMENTS

| | | | | |
|---|---|---|---|---|
| 3,329,069 | A * | 7/1967 | Feroy .................... | 74/424.71 |
| 4,792,255 | A * | 12/1988 | McArthur et al. ........... | 403/325 |
| 5,344,303 | A * | 9/1994 | Takatsugi et al. ........... | 425/190 |
| 5,800,134 | A * | 9/1998 | Hasegawa et al. .......... | 417/269 |
| 5,993,186 | A * | 11/1999 | Floyd et al. ................. | 425/190 |
| 6,461,139 | B1 | 10/2002 | Yokoya et al. | |
| 6,499,989 | B2 * | 12/2002 | Koide et al. ................. | 425/556 |
| 7,165,966 | B2 * | 1/2007 | Onuma et al. ............... | 425/550 |
| 2003/0224085 | A1 * | 12/2003 | Onuma et al. ............... | 425/550 |
| 2003/0230829 | A1 * | 12/2003 | Shiraishi et al. .......... | 264/328.1 |
| 2004/0031475 | A1 * | 2/2004 | Markley .................... | 125/13.01 |
| 2004/0071809 | A1 * | 4/2004 | Hsu et al. .................... | 425/150 |
| 2004/0182185 | A1 * | 9/2004 | Niglov .......................... | 74/87 |

FOREIGN PATENT DOCUMENTS

| | | | |
|---|---|---|---|
| EP | 0 563 397 A1 * | 4/1993 | |
| JP | SHO 60-157214 | 10/1985 | |
| JP | 2000-218663 A | 8/2000 | |
| JP | 2001-88189 A | 4/2001 | |
| JP | 2002-355867 A | 12/2002 | |

* cited by examiner

Primary Examiner—Robert J. Sandy
Assistant Examiner—Ruth C Rodriguez
(74) Attorney, Agent, or Firm—Weingarten, Schurgin, Gagnebin & Lebovici LLP

(57) ABSTRACT

A screw shaft for driving an injection screw driving body in a motor-driven injection device is coupled to a motor shaft of an electric motor in engagement of splines. A spline for the motor shaft engaging with a spline disposed at the outer periphery at a shaft end of the screw shaft is fitted into a recess formed inside of a motor shaft end. A flange formed around the spline is clamped at end face of the motor shaft via a bolt, and is formed at the inner periphery of a bearing sleeve detachably mounted to the motor shaft. An annular groove is formed at the inner periphery of an opening of the bearing sleeve for the side of the screw shaft. A ring member for air-tightly sealing a clearance formed between the screw shaft and the bearing sleeve is fitted into the annular groove. The spline for the motor shaft engaging with the spline on the screw shaft is disposed at the inner periphery of the bearing sleeve independent of the motor shaft, thus achieving the coupling via the respective splines of the motors.

4 Claims, 2 Drawing Sheets

COUPLING STRUCTURE BETWEEN INJECTION DRIVING SCREW SHAFT AND ELECTRIC MOTOR IN INJECTION DEVICE

BACKGROUND OF THE INVENTION

1. Field of the Invention

The present invention relates to a coupling structure between a screw shaft for driving an injection screw driving body and a motor shaft of electric motor in a motor-driven injection device, in which the screw shaft and the motor shaft are coupled directly to each other via splines.

2. Description of the Related Art

In addition to a system for indirectly coupling an electric motor to a screw shaft via a pulley and a timing belt, a system for directly coupling a screw shaft to a motor shaft of an electric motor is included in a motor-driven injection device, in which a screw shaft is screwed with a nut member provided on the injection screw driving body guided in a linear direction, and a rotating movement by an electric motor (i.e., a servo motor), transmitted to the screw shaft by the nut member is converted into a linear movement, so that the injection screw driving body is allowed to advance together with a screw disposed inside of a heating cylinder, thereby injecting a molten resin.

Such a directly coupling system includes a method, in which the rear end of a screw shaft is fitted into a recess formed at a motor shaft end, thereby coupling them via a parallel key, or coupling them in mutual engagement via splines, so as to transmit rotational torque to the screw shaft.

The coupling via the parallel key requires a clearance for facilitating the fitting and maintenance of the screw shaft. Therefore, the clearance is enlarged by abruptly forward or reverse rotation of an electric motor, thereby causing seizure due to fretting at a shaft portion. This raises a problem that the motor shaft cannot be separated from the screw shaft at the time of maintenance or inspection work, which are thus inevitably omitted.

In contrast, the coupling via the splines does not require particularly any clearance as described above, and further, can prevent abrasion or seizure at a portion in mutual engagement of the splines with the application of a lubricant, thereby solving the problem experienced in the case of the parallel key. However, the spline for the motor shaft is difficult to be machined, which causes high cost. Therefore, it is difficult to adopt an involute spline, which is suitable for mutually coupling rotary shafts in other fields.

Such an involute spline has a cross-sectional shape of an involute spur gear, and has centripetal characteristics, which intends to automatically become coaxial at a engaging portion, thereby preventing any inconvenience caused by center runout. Thus, a normal engaging state can be held for a long period. Furthermore, the involute spline is preferable from the viewpoints of coupling strength, assembly or disassembly, maintenance, inspection work and the like.

SUMMARY OF THE INVENTION

In view of the above-described problems observed in the prior art, an object of the present invention is to provide a coupling structure between a screw shaft for driving an injection screw driving body and a motor shaft of an electric motor in an injection device, in which a spline for the motor shaft is disposed at the inner periphery of a bearing sleeve disposed independently of the motor shaft, so that spline machining can be facilitated with high accuracy irrespective of an electric motor in addition to the adoption of the coupling via splines, thereby achieving the adoption of an involute spline, and an outflow or volatilization of a lubricant, which is applied for the purpose of prevention of abrasion and seizure, can be prevented for a long period by the effect of a ring member.

The above-described object of the present invention is achieved by a coupling structure between a screw shaft for driving an injection screw driving body and a motor shaft of an electric motor in an injection device for converting a rotating movement of the screw shaft conducted by the electric motor into a linear movement of the injection screw driving body by screwing the screw shaft and a nut member positioned at the injection screw driving body with each other and injecting resin according to an advancing movement of the injection screw driving body, wherein, for performing coupling between the screw shaft and the motor shaft of the electric motor by engagement of splines with each other provided on the screw shaft and the motor shaft, the spline for the motor shaft engaging with the spline on an outer peripheral face on a shaft end of the screw shaft is provided on an inner periphery of a bearing sleeve which is detachably mounted to the motor shaft by fitting the bearing sleeve into a recess formed inside a motor shaft end and fastening a flange integrally formed on an outer periphery of the bearing sleeve to an end face of the motor shaft with a bolt.

Furthermore, the bearing sleeve according to the present invention has an annular groove at the inner periphery of an opening for the side of the screw shaft, and a ring member for air-tightly sealing a clearance formed between the screw shaft and the bearing sleeve is fitted into the annular groove.

With the above-described configuration, the spline for the motor shaft is formed at the inner periphery of the bearing sleeve detachably mounted to the motor shaft, thereby easily machining the inner periphery of the recess formed inside of the motor shaft end than the case where it is machined directly in the spline and facilitating heat treatment, surface treatment or the like. Thus, the involute spline requiring machining accuracy is adopted, and the centripetal characteristics of the involute spline can suppress the center runout of the screw shaft to the minimum, so as to prolong the lifetime.

Moreover, since the bearing sleeve can be readily replaced as required, it is possible to prevent any damage on the screw shaft and the motor shaft caused by the abrasion or deformation of the spline, which is used for a long time, thus prolonging the lifetime of the electric motor.

Additionally, the ring member at the annular groove formed at the inner periphery of the opening for the side of the screw shaft of the bearing sleeve can air-tightly seal the clearance between the screw shaft and the bearing sleeve, thereby preventing any secular outflow and volatilization of the lubricant, which is applied to the spline for the purpose of prevention of abrasion and seizure. Thus, it is possible to maintain the prevention of any abrasion and seizure at the spline for a long period.

DETAILED DESCRIPTION OF THE PREFERRED EMBODIMENT

Figure 1:
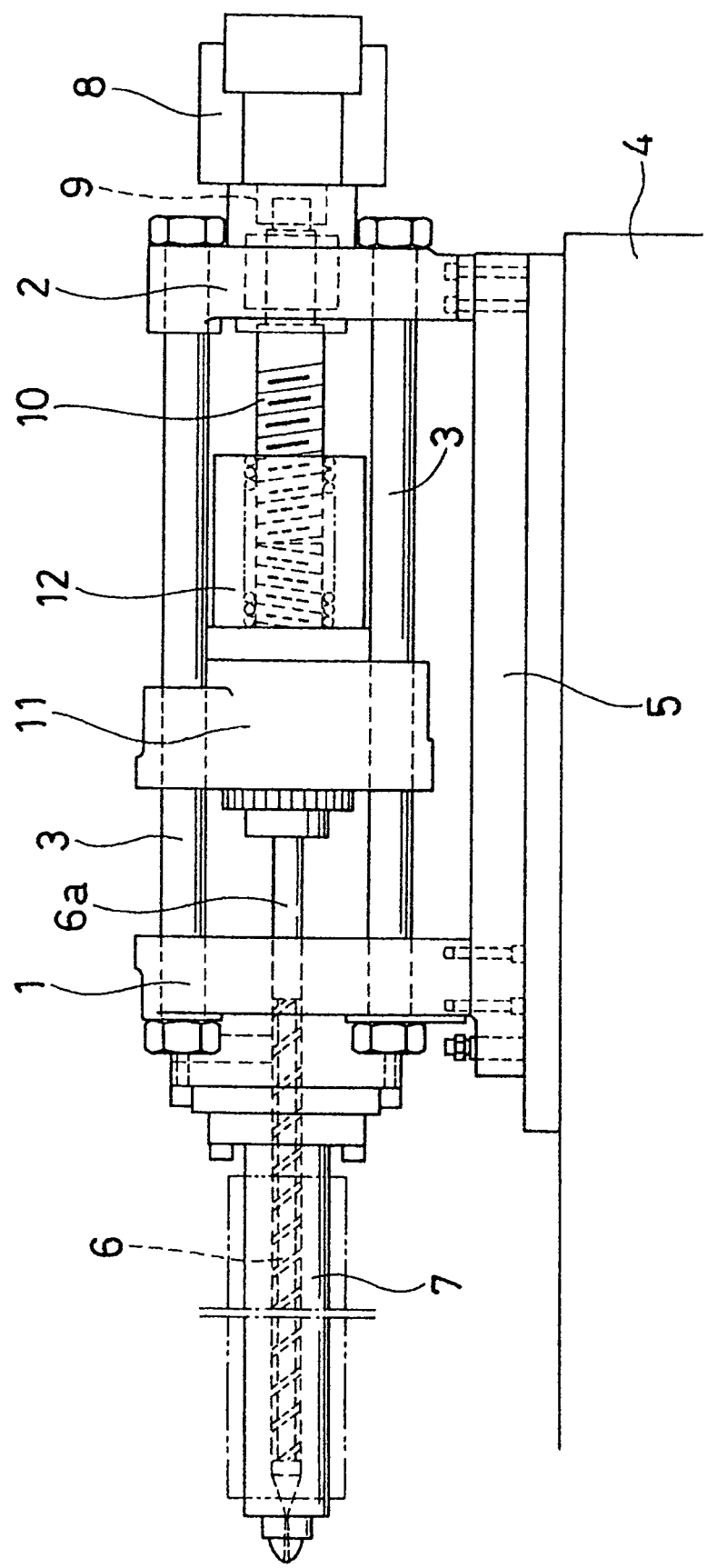
FIG. 1 is a view in explaining a motor-driven injection device, to which a coupling structure between a screw shaft for driving an injection screw driving body and a motor shaft of an electric motor according to the present invention can be applied.

FIG. 1 is a view showing one example of a motor-driven horizontal injection device. Reference numeral 1 denotes a front plate; and reference numeral 2 denotes a rear plate. Four corners of each of the plates are coupled to tie bars 3 and 3, so that the plates are securely disposed on a base plate 5 mounted on a surface of a bed 4. The front plate 1 is provided at the front center thereof with an injection heating cylinder 7 incorporating therein an injection screw 6, which can be rotated, advanced and retreated. The rear plate 2 is provided with an injection driving electric motor 8 for driving injection consisting of a servo motor and a rotatable ball screw shaft 10 coupled at the rear end thereof to a motor shaft 9 and projecting inward.

Reference numeral 11 denotes a injection screw driving body for driving an injection screw, into which the tie bars 3 and 3 are inserted at the four corners thereof and which is interposed between the front and rear plates 1 and 2 in a freely advancing and retreating manner. To the front center of the injection screw driving body is rotatably coupled a rear end 6a of the injection screw 6, although not shown. At the rear center of the injection screw driving body 11 is integrally fixed a ball nut member 12 screwed with the ball screw shaft 10 pivotally supported by inserting the ball screw shaft 10 into the center of the rear plate 2. Here, to the injection screw driving body 11 are provided with an electric motor for metering and a screw rotating mechanism, although not shown.

In the injection device having the above-described configuration, when the electric motor 8 is rotated forward, the rotating movement is transmitted to the ball screw shaft 10 coupled to the motor shaft 9, and further, the rotation of the ball screw shaft 10 is converted into a linear movement for allowing the injection screw driving body 11 to advance by the ball nut member 12 on the injection screw driving body 11 supported by the tie bars 3 and 3. Thus, the screw driving body 11 advances together with the injection screw 6, thereby injecting and filling a measured molten resin to and in a mold at the front portion of the heating cylinder 7.

Figure 2:
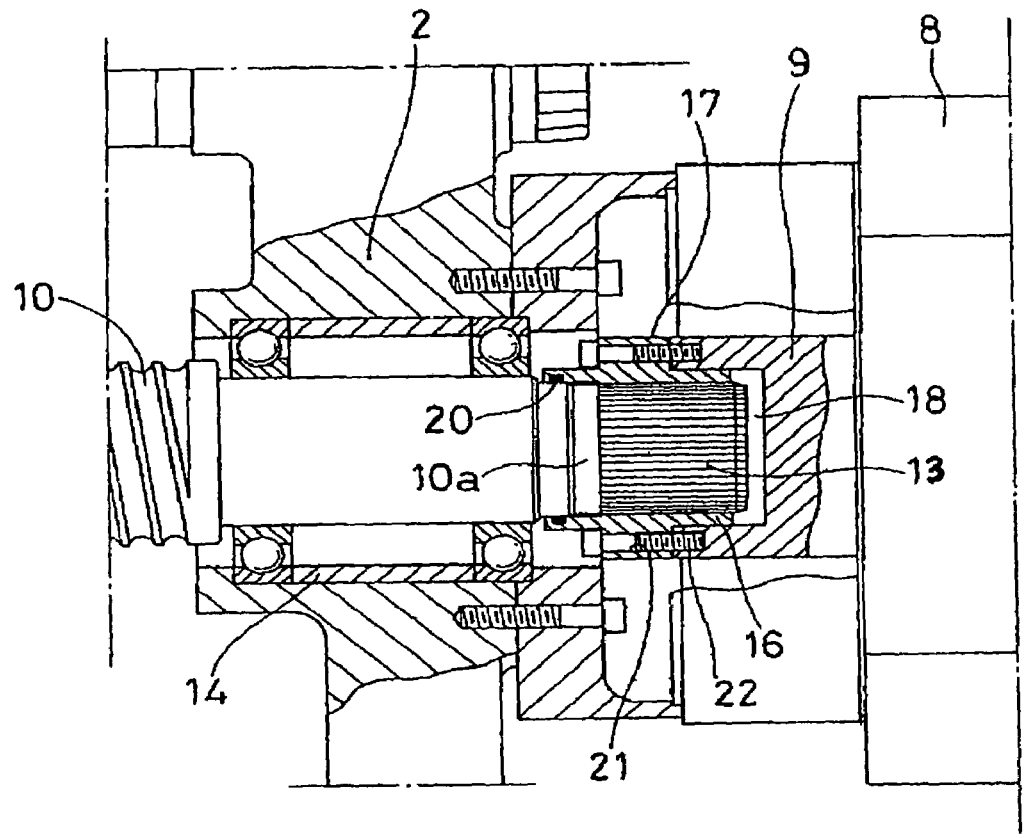
FIG. 2 is a partly longitudinal cross-sectional view showing essential parts of the coupling structure according to the present invention.
Figure 3:
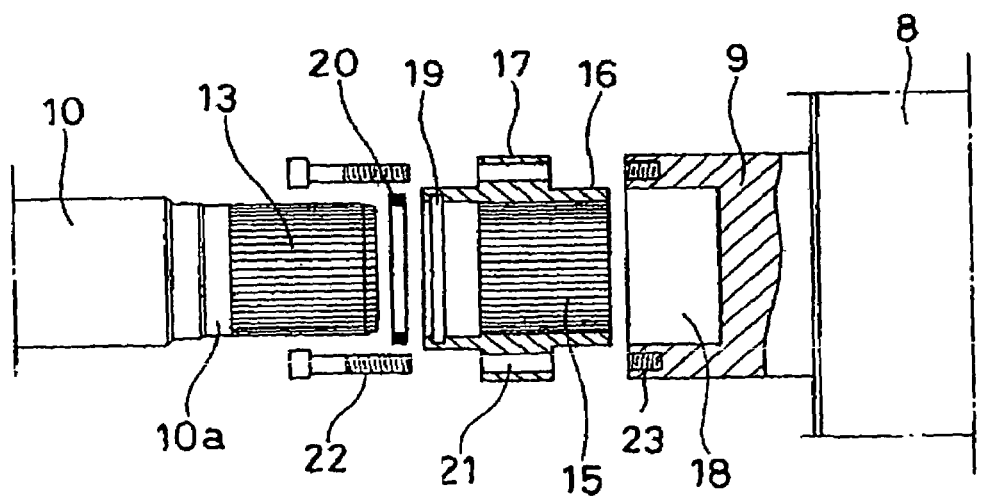
FIG. 3 is an exploded view in explaining the coupling structure according to the present invention.

As shown in FIG. 2 and FIG. 3, the motor shaft 9 and the ball screw shaft 10 are coupled integrally with each other in mutual engagement of splines. A spline 13 provided on the ball screw shaft is disposed around a shaft end 10a projecting outward of the shaft pivotally supported in a bearing case 14 in the rear plate 2; in contrast, a spline 15 for the motor shaft is formed at the inner periphery of a bearing sleeve 16. Incidentally, each of the splines 13 and 15 consists of an involute spline, although the details thereof are omitted in the Figures.

The bearing sleeve 16 is a bearing sleeve having an inner diameter engaging with the shaft end of the ball screw shaft 10, and has a flange 17 having the same diameter as that of the end face of the motor shaft therearound. At the boundary of the flange 17, the outer diameter of the rear portion is formed into a size fitted to a recess 18 formed inside of the motor shaft end. The spline 15 is disposed at the inner periphery at the rear portion from the lower portion of the flange 17 to the end edge. Moreover, an annular groove 19 is formed at the inner periphery of an opening for the side of the screw shaft. A ring member 20 such as a seal ring or an O-ring is inserted into the annular groove 19.

The rear portion of the bearing sleeve 16 is fitted into the recess 18 up to the place where the flange 17 abuts against the end face of motor shaft, and then, a bolt 22 is screwed from a bolt hole 21 formed at the flange 17 to a screw hole 23 bored at the end face of motor shaft, so that the flange 17 is securely disposed at the end face of motor shaft, to be thus detachably mounted to the motor shaft 9. Consequently, the spline 15 formed at the inner periphery of the bearing sleeve 16 serves as an inner spline in the recess 18.

In coupling the motor shaft 9 to the ball screw shaft 10, a lubricant having tenacity for preventing abrasion and seizure is sufficiently applied to the spline, followed by the insertion of a shaft end 10a of the ball screw shaft 10, so that the splines 13 and 15 engage with each other. As a consequence, both of the shafts can be integrated with each other in a rotating direction, and therefore, the rotation of the motor shaft 9 can be transmitted to the ball screw shaft 10 at the coupling portion without any looseness, thereby smoothly responding to abruptly forward or reverse rotation of the electric motor 8.

Moreover, the fitting of the shaft end 10a to the bearing sleeve 16 can air-tightly seal a clearance formed between the shaft end 10a and the bearing sleeve 16 in close contact of the ring member 19 with a portion without any spline at the shaft end 10a. Thus, the applied lubricant is contained in the bearing sleeve 16 at the time of the coupling, thereby preventing any dissipation due to the outflow and volatilization of the lubricant, so as to maintain the prevention of any abrasion and seizure by the lubricant for a long time.

Although the above-described embodiment is directed to the horizontal injection device, the present invention can be applied irrespective of a type of an injection device as long as an injection device is of a type in which a screw shaft for driving an injection screw driving body and a motor shaft are coupled directly to each other. Moreover, since the present invention can be applied to an injection driving system, in which a nut member is fixed while a screw shaft is moved, the present invention can be valuable for wide use in an injection device of a direct coupling type.

What is claimed is:

1. An injection device for injecting resin by advancing an injection screw driving body, whereby rotational movement of an electric motor is converted to linear movement of the injection screw driving body to advance the injection screw driving body, the injection device comprising:
   an injection screw operatively-coupled to said injection screw driving body;
   a ball screw shaft, having a shaft end portion and a ball screw shaft spline that is disposed on an outer periphery of said shaft end portion, operatively-coupled to said injection screw driving body via a nut member;
   an electric motor having a motor shaft;
   a bearing sleeve for coupling said ball screw shaft to said motor shaft, the bearing sleeve having:
      an inner diameter for engaging said shaft end portion of the ball screw shaft,
      a flange integrally formed on an outer periphery of the bearing sleeve for releasably attaching said bearing sleeve to an end face of said motor shaft,
      a rear portion disposed at the rear of the flange that is adapted to fit into a recess provided in the face of said motor shaft,
      an inner spline disposed at an inner periphery of the bearing sleeve, and
      an annular groove provided at the inner periphery near an opening for said shaft end portion of the ball screw shaft; and a ring member that is disposable in said annular groove, for air-tightly sealing a clearance formed between the ball screw shaft and the bearing sleeve, wherein the bearing sleeve is detachably mounted to said end face of the motor shaft by fitting the rear portion of said bearing sleeve into the recess and fastening the flange to said end face of the motor shaft such that said bearing sleeve spline serves as a spline for the motor shaft.

2. The injection device as recited in claim 1, wherein the bearing sleeve spline and the ball screw shaft spline are involute.

3. The injection device as recited in claim 1, wherein the ring member is selected from the group comprising a seal ring or an O-ring.

4. The injection device as recited in claim 1, wherein said bearing sleeve spline and said ball screw shaft spline are adapted to engage each other so that rotation of said motor shaft becomes rotation of said ball screw shaft.

* * * * *

UNITED STATES PATENT AND TRADEMARK OFFICE
CERTIFICATE OF CORRECTION

PATENT NO. : 7,223,093 B2 Page 1 of 1
APPLICATION NO. : 10/731409
DATED : May 29, 2007
INVENTOR(S) : Kinji Yokoya et al.

It is certified that error appears in the above-identified patent and that said Letters Patent is hereby corrected as shown below:

Column 4, Claim 1, Line 61, "the face" should read --the end face--.

Signed and Sealed this

Fifth Day of August, 2008

JON W. DUDAS
*Director of the United States Patent and Trademark Office*